US007917881B1

(12) United States Patent
Chen et al.

(10) Patent No.: US 7,917,881 B1
(45) Date of Patent: Mar. 29, 2011

(54) TIMING OF A CIRCUIT DESIGN

(75) Inventors: Hsi-Chuan Chen, Fremont, CA (US);
Chih-Liang Cheng, Fremont, CA (US);
Chung-Do Yang, Saratoga, CA (US);
Jeong-Tyng Li, Cupertino, CA (US)

(73) Assignee: SpringSoft USA, Inc., San Jose, CA (US)

( * ) Notice: Subject to any disclaimer, the term of this patent is extended or adjusted under 35 U.S.C. 154(b) by 413 days.

(21) Appl. No.: 11/725,188

(22) Filed: Mar. 15, 2007

Related U.S. Application Data

(60) Provisional application No. 60/817,788, filed on Jun. 29, 2006, provisional application No. 60/831,257, filed on Jul. 14, 2006.

(51) Int. Cl.
*G06F 17/50* (2006.01)
(52) U.S. Cl. ...................................................... 716/134
(58) Field of Classification Search .................. 716/6, 14
See application file for complete search history.

(56) References Cited

U.S. PATENT DOCUMENTS

| 6,230,304 | B1 * | 5/2001 | Groeneveld et al. ............... 716/7 |
| 2007/0106969 | A1 * | 5/2007 | Birch et al. ........................ 716/6 |
| 2009/0113366 | A1 * | 4/2009 | Serdar et al. ...................... 716/6 |
| 2009/0132990 | A1 | 5/2009 | McElvain et al. |

OTHER PUBLICATIONS

Mitch Heins, Pyxis Technology, EE Times Online, In the Eye of the DFM/DFY Storm, May 25, 2007, http://www.eetimes.com/showArticle.jhtml;jsessionid=5L54GMGMWMJKOQSNDLOSKHSCJUNN2JVN?articleID=199702741.
Wilbur Luo, EE Times Online, A Balanced Approach to Chip Optimization, Apr. 24, 2006, http://www.eetimes.com/showArticle.jhtml;jsessionid=5L54GMGMWMJKOQSNDLOSKHSCJUNN2JVN?articleID=185303804.
Laura Peters, Semiconductor International, Demystifying Design-for-Yield, Jul. 1, 2004, http://www.semiconductor.net/article/CA430963.html.
Jason Cong et al., Advanced Routing Techniques for Nanometer IC Designs, ICCAD 2006 Routing Tutorial.

* cited by examiner

*Primary Examiner* — Vuthe Siek
*Assistant Examiner* — Aric Lin
(74) *Attorney, Agent, or Firm* — Van Pelt, Yi & James LLP (57) ABSTRACT

Improving the timing and/or yield of a circuit design is disclosed. Timing and yield improvements are often competing objectives in circuit design since timing improvements typically result from reducing capacitive couplings and yield improvements typically increase capacitive couplings. Trade-offs between timing and yield improvements are consequently part of the circuit design and/or optimization process.

30 Claims, 7 Drawing Sheets

TIMING OF A CIRCUIT DESIGN

CROSS REFERENCE TO OTHER APPLICATIONS

This application claims priority to U.S. Provisional Patent Application No. 60/817,788 entitled "Design Automation", filed on Jun. 29, 2006, and U.S. Provisional Patent Application No. 60/831,257 entitled "Design Automation", filed on Jul. 14, 2006, which are incorporated herein by reference for all purposes.

BACKGROUND OF THE INVENTION

Typically, during timing optimizing of a circuit design, the timing of the circuit design is not attempted to be improved beyond a specified value for the design, and the circuit design is not analyzed to determine the places in the design where potentials for optimization exist. It would be useful to more intelligently improve the timing of a circuit design.

Yield optimization of a circuit design is typically performed independently of timing optimization and often results in degradation of the timing obtained during timing optimization. It would be useful to more intelligently optimize the yield of a circuit design.

Thus, there is a need for improved timing and/or yield optimizations for a circuit design.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Improving the timing and/or yield of a circuit design is disclosed. Timing and yield improvements are often competing objectives in circuit design since timing improvements typically result from reducing capacitive couplings and yield improvements typically increase capacitive couplings. Tradeoffs between timing and yield improvements are consequently part of the circuit design and/or optimization process.

Figure 1:
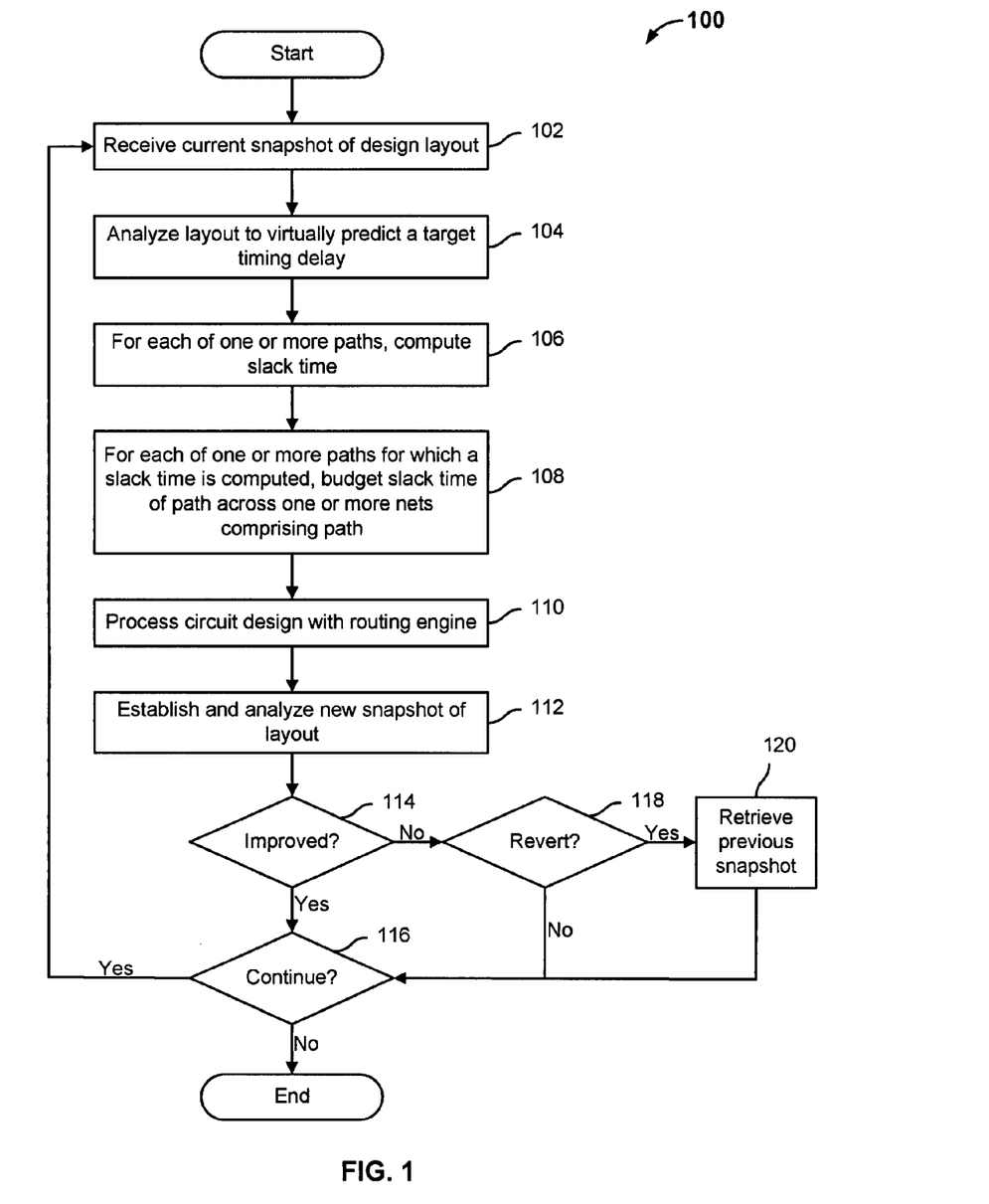
FIG. 1 illustrates an embodiment of a process for improving the timing and/or yield of a circuit design.

FIG. 1 illustrates an embodiment of a process for improving the timing and/or yield of a circuit design. In some embodiments, timing delay is improved by pushing neighboring wires, if possible, to reduce the capacitive coupling between the wires. In some embodiments, the yield of a circuit design is improved by replacing single-cut vias with double-cut vias to increase redundancy in the design. Process 100 starts at 102 at which a current snapshot of a design layout is received. In some embodiments, the snapshot received at 102 corresponds to an initial design layout, for example, as provided by a manufacturer. In various embodiments, such an initial design layout may be created using grid-based or gridless routing technology. It may be useful to optimize the timing and/or expected yield of a design, for example using one or more steps of process 100, prior to fabrication. One or more design specifications, such as a target timing delay (or target operating frequency), target yield (which can be measured, for instance, by the number or percentage of double-cut vias in the design), etc., may be provided with an initial design layout.

At 104, the snapshot received at 102 is analyzed to estimate or predict a realistic target timing delay for the circuit design. In some embodiments, a target timing delay lower than a target value specified with design specifications is estimated at 104. In some embodiments, it is desirable to determine the lowest possible target timing delay for a given circuit design at 104 so that the design can be optimized to perform at the highest achievable operating frequency. In the cases where a target is specified with design specifications, it may be desirable to get as close as possible to, if not improve on, the specified target at 104 if possible. In some embodiments, however, such a specified target timing delay is unattainable with a given layout, and a more realistic value for the target is determined at 104 for the given layout. A margin or tolerance may exist with a desired target timing delay, and it may be desirable to still manufacture a design that has a lower operating frequency (i.e. higher timing delay) than initially desired when the desired target timing delay is unattainable for a given layout. In the cases in which a target timing delay (or operating frequency) is not specified with design specifications, the layout it still analyzed at 104 to estimate an optimal target timing delay for the given design. An acceptable window or range of values for the target timing delay may be specified or estimated for a particular circuit design, and a target timing delay may be selected from such a range at 104, if possible, so that the resulting operating frequency of the circuit is not too slow or too fast. As sometimes used herein, the term "virtual timing optimization" refers to the process of virtually estimating a realistic target timing delay for a particular circuit design given other design constraints, if any.

Each signal propagating through an 110 path experiences a timing delay or lag from input to output. The target timing delay of a circuit is based on a critical path, i.e. a path with the greatest timing delay that establishes the operating frequency of the circuit. Each path in a circuit is comprised of one or more nets. A net can be defined as, for example, a wiring connection that carries a signal from a driving cell to its receiving cell(s). If possible without violating design rules, the timing delay associated with a path can be improved by reducing the capacitive coupling between one or more nets comprising the path and one or more neighboring wires or nets. In some embodiments, one or more wires adjacent to or neighboring a given net are pushed away, if possible, from the given net to reduce the capacitive coupling and consequent timing delay contributed by the given net to an associated path. In some embodiments, the target timing delay for a particular circuit design is at least initially estimated at 104 by presuming that wires can be pushed to at least a prescribed spacing away from other wires, if such a prescribed spacing does not already exist between adjacent wires. For example, it may be at least initially assumed that the spacing between each of at least a subset of neighboring wires and a given net can be a prescribed factor times the minimum spacing required by design rules, and if such a prescribed spacing does not already exist, it may at least initially be assumed that each neighboring wire can be pushed the requisite distance away from the given net to meet the prescribed spacing. In some embodiments, the prescribed spacing between adjacent wires is selected to be three times the minimum spacing required to meet design rules since the capacitance reduction achieved by further increasing spacing by pushing wires diminishes rapidly after a spacing of three times the minimum required spacing is achieved. The prescribed spacing between wires selected during a virtual timing optimization process serves as a theoretical upper bound for spacing between wires above which the advantages gained from wire spreading may become negligible. In some embodiments, such as when estimating the best possible target timing delay at 104, it is at least initially assumed that all neighboring wires can be pushed away so that the prescribed spacing exists between a given net and its neighboring wires. However, it may not be possible to push all surrounding wires such that the prescribed spacing exists, and in such cases the target timing delay may need to be redefined, for example, in subsequent iterations of process 100.

Potential to reduce capacitive coupling and consequently improve the timing delay associated with a net exists when one or more neighboring wires are close to the net since one or more of such neighboring wires may be able to be pushed further away from the net without violating design rules to increase spacing and hence reduce capacitive coupling. Neighboring wires that are already a sufficient spacing away from a given net (e.g., greater than the prescribed spacing) provide little opportunity for reducing capacitive coupling with the given net even if they can be pushed further away. In some embodiments, the potential to reduce the capacitive coupling associated with a net by pushing away neighboring wires depends at least in part on the number of neighboring wires and/or the current spacings between the net and its neighboring wires. In some embodiments, based at least in part on the expected potential for wire spreading (pushing) and consequent reduction in capacitive coupling, if any, RC extraction, delay calculations, timing analyses, etc., are performed to virtually determine a target timing delay at 104. When a neighboring wire is attempted to be pushed away from a given net during routing as described further below, however, it may not be possible to push the neighboring wire at all or enough to meet the prescribed spacing since the neighboring wire may in turn have one or more neighboring wires or other components and design rules need to be continued to be complied with as the neighboring wire is pushed. Since real estate on a chip is limited, it may not be possible for all wires to be separated by the prescribed spacing. For instance, only limited wire spreading, if any at all, may be possible in densely packed areas of a circuit. In some embodiments, wire spreading is only performed, if possible, relative to one or more nets for which valuable timing improvements are expected as a result of pushing neighboring wires during process 100. In some embodiments, it is useful to incrementally push one or more neighboring wires via an iterative process, such as process 100, so that the design layout is minimally disturbed during each iteration and can be checked to determine effects on timing while obtaining, through the iterative process, the maximum achievable spacing, which may be upper bound by the prescribed spacing above which it is not advantageous to further increase spacing, between one or more adjacent wires or nets. The target timing delay estimated at 104 may be adaptively adjusted based on feedback obtained about the ability to push one or more wires and the consequent effects on timing during each iteration to eventually obtain an optimal or near optimal target timing delay for a given circuit design.

Figure 2A:
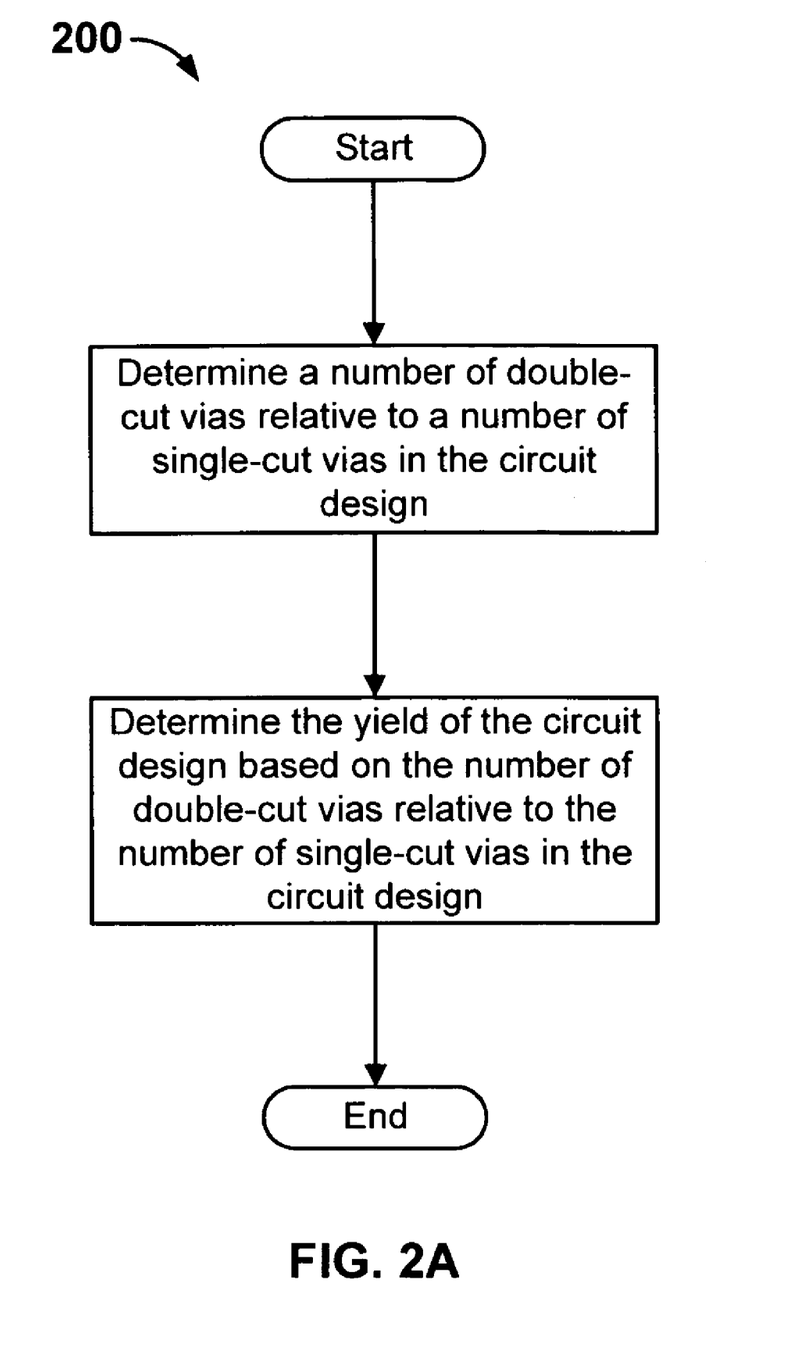
FIG. 2A illustrates an embodiment of a process for determining yield.

In some embodiments, virtual timing optimization depends at least in part upon the target yield desired for a given circuit design. The number or percentage of double-cut vias relative to single-cut vias may serve as a measure of the expected manufacturing yield of a circuit design which, for example, may be determined using process 200 of FIG. 2A. It may be desirable to increase the expected yield of a circuit design by increasing redundancy by converting one or more single-cut vias into double-cut vias. A process sometimes referred to herein as "virtual double via insertion" may be used to virtually estimate an optimal yield for a circuit design at 104 given other design constraints, if any. While increasing redundancy, the additional cut in a double-cut via increases capacitance due to coupling with neighboring components. As such, the timing of a circuit design may be detrimentally affected when one or more single-cut vias are converted into double-cut vias to improve yield. Timing optimization and yield optimization are thus competing objectives in circuit design. Timing optimization can be achieved by reducing capacitive coupling between components (e.g., by spreading wires) whereas yield optimization can be achieved by inserting more double-cut vias which increase the capacitive coupling with neighboring components and consequently their associated timing delays. In some embodiments, a trade-off between timing optimization and yield optimization is made to arrive at a target timing delay at 104.

Figure 2B:
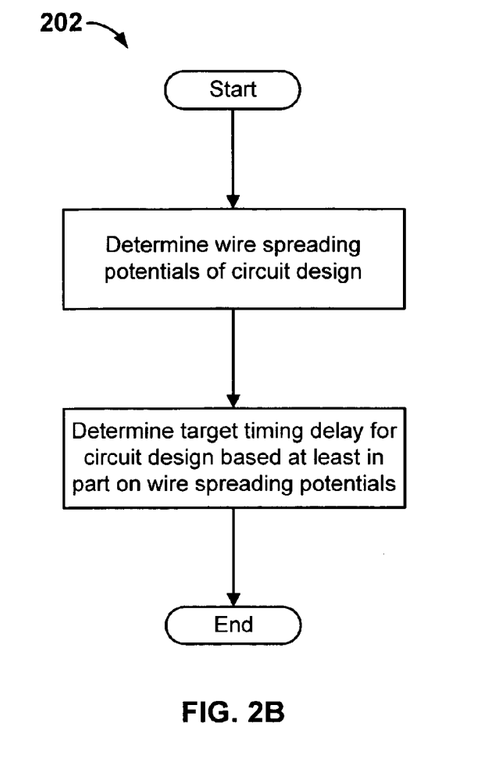
FIGS. 2B-2C illustrate embodiments of processes for determining target timing delay.
Figure 2C:
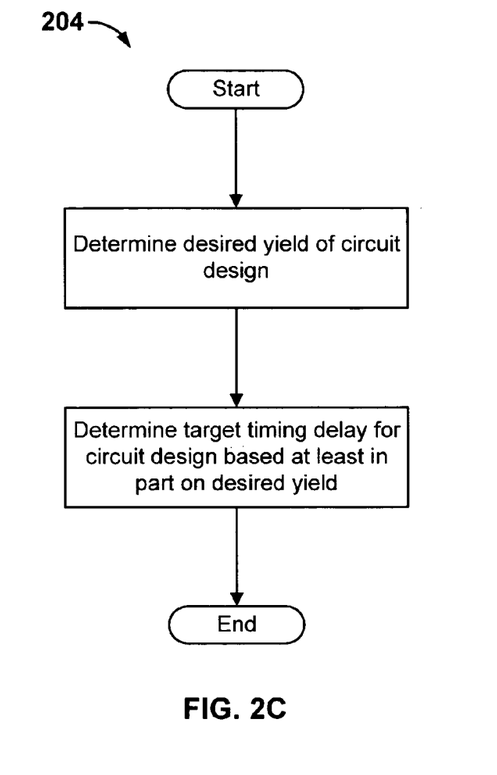
Figure 3A:
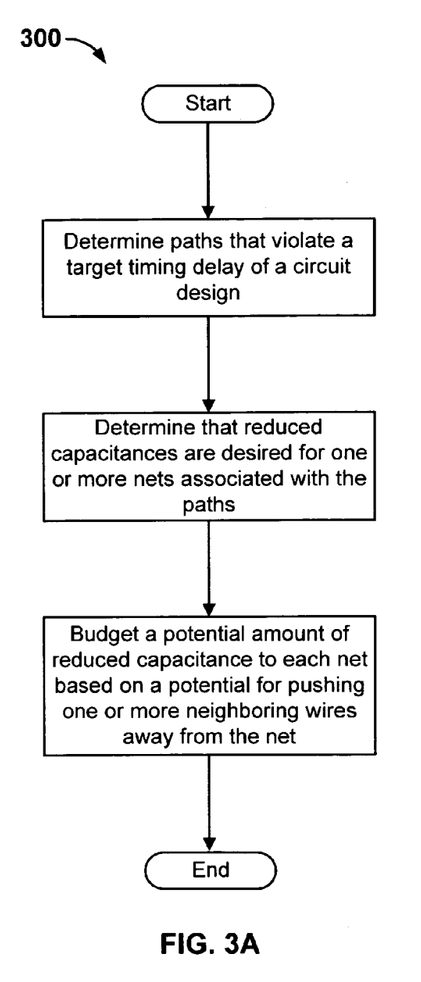
FIGS. 3A-3C illustrate embodiments of processes for budgeting capacitances.
Figure 3B:
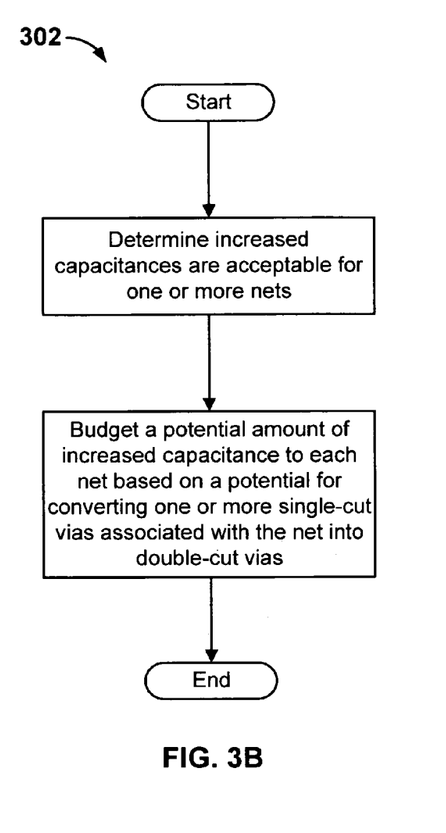
Figure 3C:
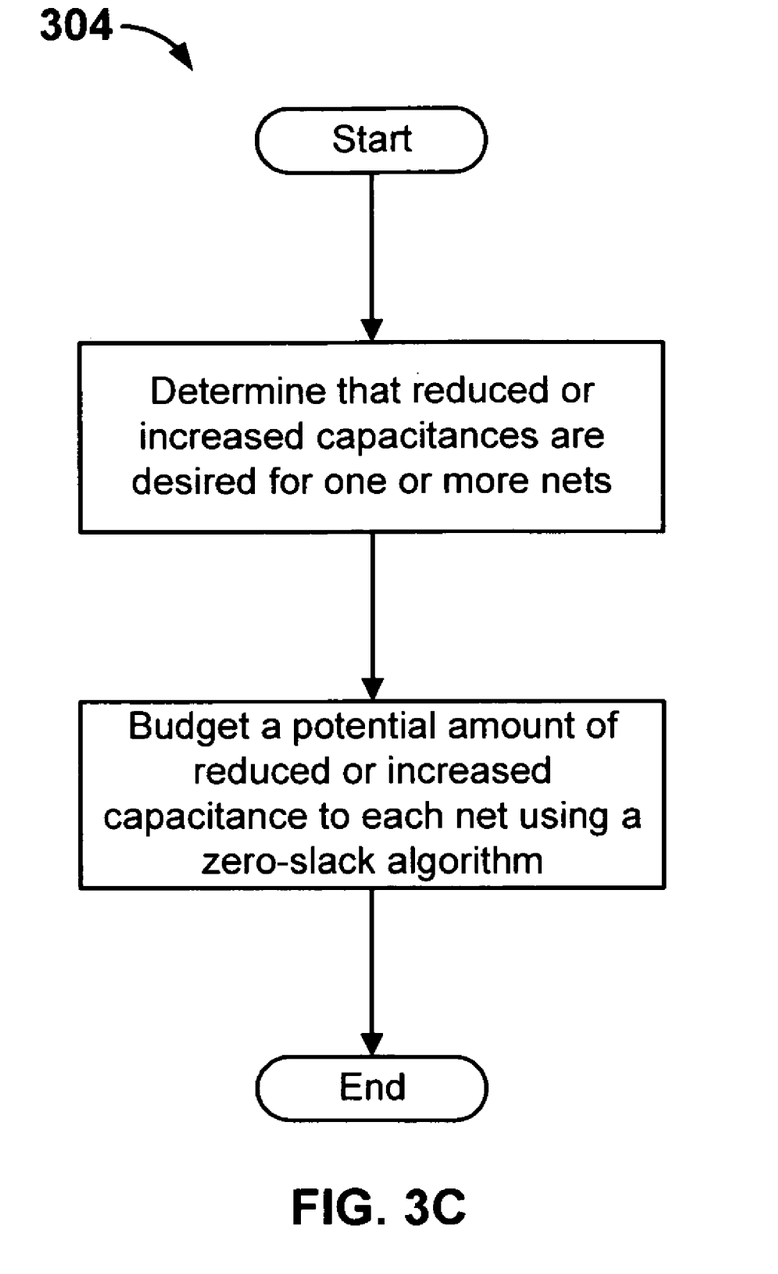

Virtual timing optimization may be employed to determine a realistic target timing delay based on desired timing and/or yield values for a circuit design. In some embodiments, the target timing delay estimated at 104, e.g., using process 202 of FIG. 2B and/or process 204 of FIG. 2C is based on the wire spreading potentials (i.e. the number of neighboring wires and/or current spacings with neighboring wires) and/or desired yields (e.g., percentages of double-cut vias) of one or more paths in the circuit design. In some cases, a higher target timing delay may need to be estimated at 104 so that a desired yield can be achieved for a given design. In some cases, at least some of the capacitance budget needed for a desired yield may be obtained by wire spreading. Even though wire spreading can be used to lower the timing delay of a path, in some cases the lowest possible timing delay for a given design may not be achievable because the reduction in capacitance gained from wire spreading is offset by the increase in capacitance resulting from the insertion of double-cut vias to achieve the desired yield. For example, consider that the critical timing delay of an initial circuit design is 2.5 ns. By spreading wires, it may be possible to improve the critical timing delay of the given design to 2.3 ns. However, 2.5 ns may still be selected as the target timing delay at 104, for example, because it is desirable to expend the reduction in capacitive coupling gained by spreading wires to increase yield by converting one or more single-cut vias into double-cut vias. Thus, reductions in capacitive coupling expected from spreading or pushing wires may be used to reduce timing delays and/or improve yields of associated paths. In some cases, the target timing delay estimated at 104 may be higher than a target timing delay value specified with design specifications if it is not possible to achieve the specified target value with the given layout and desired yield, or the expected yield (e.g., the number of double-cut vias) may need to be reduced.

In some embodiments, the target timing delay of a circuit estimated at 104 is based at least in part on the wire spreading potentials of the worst case (i.e. critical or near critical) timing delay paths in the circuit and may also be based on the desired yields (e.g., desired percentage of double-cut vias) along such paths or on the desired yield of the circuit as a whole. The timing delays of non-critical paths in the circuit are less than the target timing delay. The performance of the circuit, however, would not be compromised if the total delays on such non-critical paths were increased as long as the delays do not exceed the target timing delay which governs the operating frequency of the circuit. The difference between the target timing delay and the actual timing delay of a path is the slack time of the path. If the slack time of a path is positive (i.e. actual timing delay is less than target timing delay), the slack time (or equivalently the associated capacitance) can be expended by converting one or more single-cut vias into double-cut vias along the path to increase redundancy and yield. In such cases, it may be desirable to reduce the actual timing delay of a path by pushing neighboring wires, if possible, to increase the slack time so that more double-cut vias can be inserted along the path. Any positive slack attainable on a path, therefore, can be expended on increasing the number of double-cut vias on the path. Insertion of one or more double-cut vias will typically decrease the slack (e.g., by increasing the capacitive coupling and consequently the actual timing delay) of the path. Single-cut vias may be converted into double-cut vias as long as the slack of a path does not fall below zero (i.e. the actual timing delay of the path does not exceed the target timing delay). If the slack of a path is negative (i.e. actual timing delay is greater than target timing delay), wire spreading may initially be attempted to increase the slack. In such cases, if the negative slack can be sufficiently increased by reducing capacitive coupling by pushing neighboring wires so that it becomes a positive value, the positive slack can be expended by converting one or more single-cut vias into double-cut vias such that the final slack of the path is at or above zero.

In some embodiments, double-cut via insertion is incrementally performed using an iterative process, such as process 100. Since double-cut via insertion may detrimentally affect timing on one or more paths, it is desirable, in some embodiments to incrementally insert double-cut vias so that the resulting changes in the circuit can be evaluated to check for effects on timing during each iteration. The effects of wire spreading on timing are also evaluated during each iteration. Such a timing evaluation during each iteration may at least in part dictate how to proceed with timing and/or yield optimization in the next iteration. For example, if the changes made to a circuit during a given iteration detrimentally affect timing, it may be desirable to undo at least some of the changes in the next iteration. The target timing delay virtually determined at 104 is an estimate for a particular circuit design or snapshot, and may be redefined over various iterations of process 100 based upon feedback from the process on the ability and/or effects of spreading wires and/or converting single-cut vias into double-cut vias during routing. In some embodiments, it is useful to simultaneously and incrementally perform wire spreading and double-cut via insertion using process 100 so that optimal or near optimal timing and yield values can be obtained for a given circuit design. In other embodiments, timing and yield optimization may be sequentially performed using at least parts of process 100. For example, it may be desirable to first improve the timing of a circuit design by pushing wires and then improve yield by inserting one or more double-cut vias, which may result in a higher final timing delay than obtained during timing optimization. Alternatively, it may be desirable to first convert single-cut vias into double-cut vias to achieve the desired yield and then to perform timing optimization by pushing wires to get an optimal timing with the given yield. In some embodiments, process 100 is employed to exclusively perform timing optimization or yield optimization.

Upon virtually determining a target timing delay at 104, the slack times of one or more paths are computed at 106. As stated above, the delta (i.e. difference) between the target timing delay determined at 104 and the actual timing delay of a path is the slack time of the path. The slack time of a violating path whose actual timing delay is worse (i.e. greater) than the target timing delay is negative, and the slack time of a non-violating path whose actual timing delay is better (i.e. less) than the target timing delay is positive. For each of one or more paths for which slack times are computed at 106, the computed slack time of a path is distributed or budgeted across one or more nets comprising the path at 108. In some embodiments, the zero-slack algorithm is used to distribute or budget the slack time of a path across the nets comprising the path so that the total actual timing delay of the path after slack distribution is equivalent to the target timing delay, i.e. the slack of the path is zero. In some embodiments, each of the nets comprising a path is assigned a weight based on, for example, the potential for improving the timing delay associated with the net by pushing surrounding wires and/or the potential for improving the yield associated with the net by converting one or more single-cut vias into double-cut vias. Such weightings associated with the nets of a path may be employed with an algorithm, such as the zero-slack algorithm, and may affect the budgeting of the slack time of the path across the nets. For example, weightings may be assigned to nets such that, if possible, negative slacks are budgeted to nets with wire spreading potential and positive slacks are budgeted to nets that can support double-cut vias. The portion of the slack time of a path distributed or budgeted to a net of the path is sometimes referred to herein as the "distributed" or "budgeted" slack time of the net.

The slack time budgeted to a net can be converted into an equivalent wire capacitance based on Equation 1:

$$\Delta\tau = R\Delta C \qquad \text{(Equation 1)}$$

wherein $\Delta\tau$ corresponds to the slack time budgeted to a net, R corresponds to the driving cell resistance associated with the net, and $\Delta C$ corresponds to the delta capacitance associated with the budgeted slack time. In some embodiments, the driving cell resistance associated with a net is obtained from a table look-up assuming a fixed input transition and output load. Since during each iteration of process 100 the layout of a circuit design is minimally changed during routing, in some embodiments, it can be assumed that the resulting changes in driving cell resistances are negligible. In such cases, R can be treated as a constant in Equation 1, and the delta capacitance is equivalent to the budgeted timing slack divided by the driving cell resistance. The delta capacitance associated with a net is positive or negative depending on whether the budgeted slack time is positive or negative. The delta capacitances budgeted to the nets comprising a path signify the changes in capacitances desired for the nets. In various embodiments, process 300 of FIG. 3A, process 302 of FIG. 3B, and/or process 304 of FIG. 3C may be employed to budget capacitances.

Timing and/or yield improvements performed with respect to a net may be dictated by the slack time (or equivalently delta capacitance) budgeted to the net. For example, if the slack time budgeted to a net is negative, it is desirable, in some embodiments, to reduce the capacitive coupling of the net by at least the associated delta capacitance if possible. Capacitive coupling can be decreased by pushing neighboring wires or nets away from a given net, for example, so that a prescribed spacing exists with neighboring wires, if possible. In some cases, if neighboring wires can be pushed away enough without violating design rules such that the capacitive coupling associated with a net can be reduced beyond the delta capacitance, the additional reduction in capacitance can be expended by inserting one or more double-cut vias in place of single-cut vias to improve yield while still maintaining the timing for the path. In some cases, any additional reduction in capacitance beyond the delta capacitance can be used to offset any negative delta capacitance on another net of an associated path whose capacitive coupling can not be (further) reduced so that the total actual timing delay of the entire path is less than or equal to the target timing delay. If the slack time budgeted to a net is positive, the capacitive coupling associated with the net may be increased by the associated delta capacitance. Since double-cut vias may increase capacitive coupling, in the cases in which a net is budgeted a positive slack time or delta capacitance, one or more double-cut vias may be inserted in place of single-cut vias to increase the yield. In some embodiments, at least a part of the positive delta capacitance budgeted to a net may be used to offset a negative delta capacitance on another net on an associated path so that the total actual timing delay of the path is less than or equal to the target timing delay. In some embodiments, each net of a path with a negative slack is budgeted a zero or negative delta capacitance, and likewise each net of a path with a positive slack is budgeted a zero or positive delta capacitance. In some embodiments, one or more neighboring wires may be pushed away from a net if possible even though a positive slack time (delta capacitance) is budgeted to the net. In such cases, for example, the further reduction in capacitance may be expended by converting more single cut vias into double-cut vias and/or may be used to offset negative delta capacitances in other nets associated with a corresponding path. If the slack time of a path (and budgeted to its corresponding nets) is zero, wire spreading may be attempted to reduce the capacitive coupling associated with one or more nets of the path so that, for example, one or more double-cut vias may be inserted along the path to increase yield. In some embodiments, the budgeting of the slack time of a path across the nets comprising the path may be adaptively updated based upon feedback on the abilities to push wires and/or insert double-cut vias relative to one or more nets. Optimization potentials such as the level of difficulty in pushing away neighboring wires and/or in inserting double cut vias on a net may change based on feedback from a routing engine in previous iterations. For example, if a particular net is budgeted a negative slack time but it is determined that it is difficult to push neighboring wires away from the net, in subsequent iterations of process 100, if possible, a positive (or zero) slack time may be budgeted to the net. The budgeting of slack time across nets is initially based upon predictions on the potentials to spread wires and/or support double-cut vias and can be corrected over multiple iterations. The target timing delay of 104 and, thus, the slack times of paths may change during one or more iterations of process 100, and in such cases the budgeting of the slack time of a path across the nets comprising the path is updated.

In some embodiments, 106 and/or 108 include marking one or more of the most timing violating paths and/or nets with the most negative delta capacitances as candidates for wire spreading. Candidate paths and/or nets may be given higher priority by a routing engine when performing wire spreading since such candidate paths and/or nets are critical in determining whether an estimated target timing delay can be satisfied and/or the extent to which the timing delay of a circuit design can be optimized. In some embodiments, candidates paths and/or nets are marked as critical. In some embodiments, one or more other paths (which are already timing violating and/or are close to being timing violating) and/or nets (which have negative, zero, or very small positive delta capacitances) are also marked as critical since worsened timing delays (coupling capacitances) on such paths and/or nets may be detrimental to the overall design timing. In such cases, for example, it may be desirable to maintain at least the current spacings between critical nets and their neighboring wires so that their coupling capacitances are not further increased and/or it may be desirable not to insert double-cut vias to increase yield with respect to such critical paths and/or nets since double-cut vias may increase capacitive coupling. However, even though a path and/or net is critical, in the cases in which it is possible to increase yield without breaking the target timing, it may be desirable to convert one or more single-cut vias into double-cut vias with respect to one or more such critical paths and/or nets. In some embodiments, the coupling capacitances of one or more critical paths and/or nets are monitored by a routing engine during wire spreading and/or double via insertion to ensure that coupling capacitances are not further worsened and/or the target timing delay is not violated. In some embodiments, however, it is desirable to move out of a local optimal solution by allowing coupling capacitances to increase on some critical paths and/or nets. In some such cases, a statistical model may be employed to unmark a group of one or more critical paths and/or nets to enable exploration of a larger solution space.

Figure 4A:
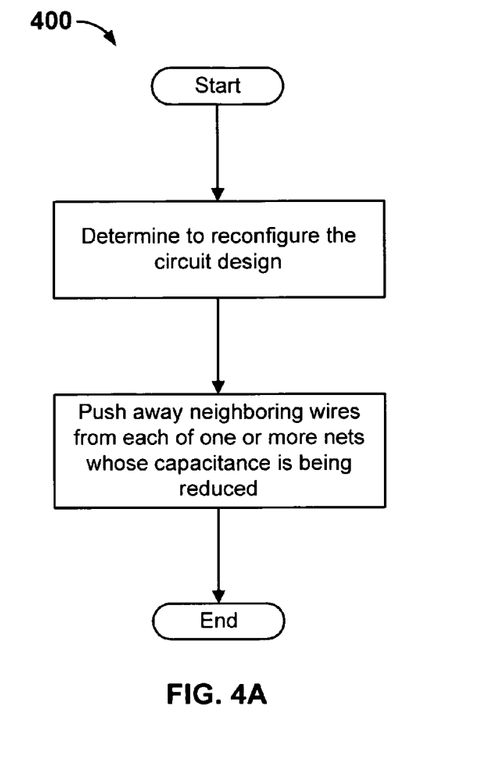
FIGS. 4A-4C illustrate embodiments of processes for reconfiguring a circuit design.
Figure 4B:
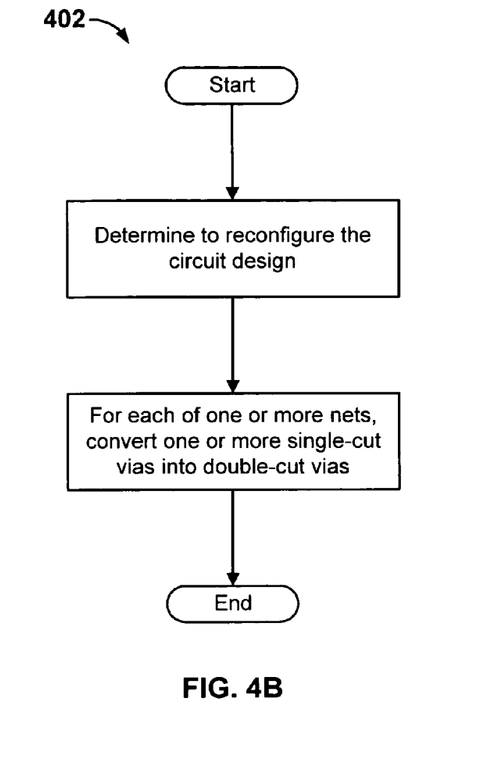

At 110, the circuit design is processed by a routing engine which may, for example, spread wires and/or convert one or more single-cut vias into double-cut vias, e.g., using process 400 of FIG. 4A and/or process 402 of FIG. 4B, so that the timing and/or yield of the circuit design can be improved. In some embodiments, the delta capacitances budgeted to one or more nets at 108 enable the routing engine to more intelligently operate on the circuit design. For example, the routing engine may be guided by a budgeted delta capacitance when determining whether to and/or the extent to push neighboring wires and/or convert single-cut vias into double-cut vias with respect to a given net. For instance, a negative delta capacitance may guide the router to push neighboring wires, if possible, and a positive delta capacitance may guide the router to convert one or more single-cut vias into double-cut vias, if possible. In some embodiments, the routing engine first operates on one or more candidate paths and/or nets since candidate paths and/or nets are the most critical paths and/or nets in a circuit design that affect the timing of the circuit. In some embodiments, while performing wire spacing adjustments and/or converting single-cut vias into double-cut vias, the routing engine monitors the wire spacings and/or capacitive couplings of critical paths and/or nets to ensure that the capacitive couplings of critical paths and/or nets do not increase at all or beyond an acceptable amount. In some embodiments, the pushing of neighboring wires and/or insertion of double-cut vias relative to one or more nets are incrementally performed during each iteration of process 100 so that the layout of the circuit is minimally disturbed during each iteration and so that the effects on timing can be evaluated during each iteration. The effects on timing from the incremental changes to the layout may affect the manner in which timing and/or yield adjustments are made in subsequent iterations.

Figure 4C:
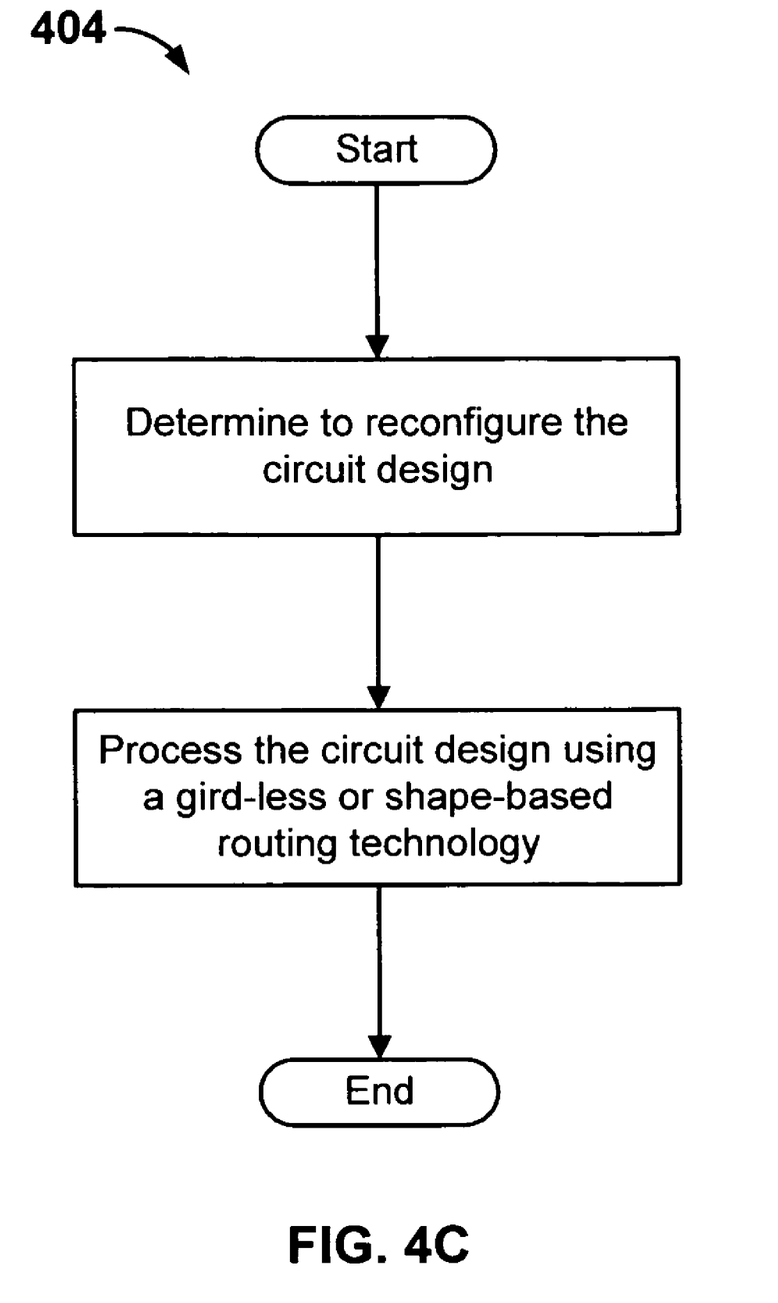

In some embodiments, the routing engine of 110 is grid-based. In other embodiments, the routing engine of 110 is grid-less or shaped-based. For example, process 404 of FIG. 4C may be employed by the routing engine. In some cases, it is advantageous to optimize timing using more flexible grid-less routing technology. Grid-less routing technology does not limit wire placement to discrete gridlines as required by grid-based routing technology but allows wires to be placed anywhere on a continuous grid as long as design rules are not violated. Thus, grid-less routing can be employed to maximize the spacing (or at least increase the spacing enough to meet a desired prescribed spacing if possible) between neighboring wires so that the capacitive coupling between neighboring wires can be reduced and the timing improved. Grid-less routing allows wire spacing adjustments to be performed in very small increments if desired. Since such incremental wire spacing adjustments result in minimal changes to the design layout and very small changes to coupling capacitances during each timing optimization iteration, convergence to an optimal timing can be more efficiently obtained in some embodiments.

Timing and/or yield adjustments with respect to the same path and/or net may be performed over one or more iterations of process 100 at 110. In some embodiments, adjustments to the same path and/or net are incrementally performed over successive iterations of process 100 at 110 until no or little improvements can be achieved. In some embodiments, in order to optimize timing, different segments of the same neighboring wire may be pushed by different amounts depending on the potential to push away the different segments while still conforming to design rules, and as a result different spacings may exist between a given net and different segments of a neighboring wire. In various embodiments, timing and yield adjustments may be individually and/or simultaneously performed for a given path and/or net at 110 during each iteration of process 100. In some embodiments, timing and/or yield adjustments are performed simultaneously for a plurality of paths and/or nets at 110. In such cases, the plurality of paths and/or nets are situated in different locations of a circuit so that changes to one path and/or net do not affect other paths and/or nets whose timing and/or yield are simultaneously being adjusted. In some embodiments, parallel processing is employed to simultaneously operate on a plurality of paths and/or nets at 110. In some such cases, parallel processing is possible by employing a plurality of processors, e.g., one for each path and/or net. In some embodiments, a path and/or net operated on during 110 may be marked or flagged to indicate that the timing (or capacitive coupling) of the path and/or net should not be further altered, if possible, when other paths and/or nets are optimized so that the timing and/or yield optimizations obtained for the path and/or net can be preserved.

After processing for the current iteration is completed by the routing engine at 110, a new snapshot of the layout is established and analyzed at 112. Since during each iteration only a few incremental changes are made to a layout, in some embodiments, timing analysis is not performed for the entire layout at 112 but only for the parts of the layout that are critical and/or may have been affected by the changes made so that the timing analysis can be quickly performed. For example, in such cases, timing analysis may be conducted only for one or more paths and/or nets with respect to which changes were made, one or more paths and/or nets neighboring the paths and/or nets with respect to which changes were made, one or more critical paths and/or nets of the circuit, etc., and in such cases it may be assumed that the timing of the paths and/or nets that are not analyzed at 112 have not changed. In some embodiments, the analysis of 112 includes determining the yield of the new snapshot. In some cases, the yield may be incrementally calculated by keeping track of the number of double-cut vias that were inserted at 110.

At 114 it is determined if the timing and/or yield of the new snapshot is/are better than the previous best timing and/or yield obtained during one or more previous iterations of process 100. In some cases, the routing performed at 110 may detrimentally affect the timing and/or yield. In some embodiments, one or more previous snapshots are saved so that process 100 can revert back to and continue processing with a previous snapshot, for example if the timing and/or yield has/have worsened. If it is determined at 114 that the timing and/or yield of the new snapshot is/are better than the previous best timing and/or yield, process 100 continues with the new snapshot to 116. If it is determined at 114 that the timing and/or yield of the new snapshot has/have not improved, for example, relative to the best timing and/or yield obtained with a previous snapshot, it is determined at 118 whether to revert back to such a previous snapshot for further iterations of process 100. In some cases, even though it is determined at 114 that the timing and/or yield of the new snapshot has/have not improved or is/are the same as the best timing and/or yield obtained during a previous iteration, it may still be desirable to continue processing with the new snapshot, for example, to attempt to improve the timing and/or yield in subsequent iterations of process 100; because, although not better, the timing and/or yield of the new snapshot is/are not worse or too much worse than the best timing and/or yield obtained during one or more previous iterations; because although the timing is worse, the yield of the new snapshot is better or vice versa; etc. In such cases, it is determined at 118 not to revert to a previous snapshot, and process 100 continues with the new snapshot to 116. If it is determined at 118 to revert to a previous snapshot, for example, because better timing and/or yield results was/were obtained for a previous snapshot, the previous snapshot is retrieved at 120, and process 100 continues with the previous snapshot to 116.

At 116, it is determined whether to continue process 100, i.e., whether to continue with a new iteration of process 100. In some embodiments, process 100 is iterated a fixed number of times. In some embodiments, if the fixed number of iterations have been performed, process 100 ends. In some embodiments, process 100 is iterated until further improvements can not be achieved. In some such cases, process 100 is stopped if timing and/or yield degradation has/have occurred for a prescribed number of previous consecutive iterations. In some embodiments, in the cases in which it is determined at 116 not to continue process 100, the snapshot with the best timing and/or yield results is selected as the final design layout before process 100 ends. If it is determined at 116 to continue with a new iteration, process 100 returns to and continues with 102 wherein the snapshot at 116 becomes the current snapshot at 102.

During each iteration of process 100, a target timing delay is predicted at 104, slacks are computed at 106 and budgeted at 108, incremental routing operations are performed at 110, the resulting changes to the layout are evaluated at 112, and a snapshot with which to continue is selected at 114, 118, and/or 120. The target timing delay predicted at 104 may be adjusted during the iterations of process 100 based upon feedback from previous iterations. In some embodiments, if it is found over one or more iterations of process 100 that a particular target timing delay determined at 104 can not be achieved, for example, for a particular design layout and/or desired yield, a more realistic or attainable target timing delay is predicted at 104 in subsequent iterations. In some embodiments, if it is found over one or more iterations of process 100 that a better target timing delay can be achieved than that predicted at 104, in subsequent iterations of process 100, the improved target is predicted at 104. In some embodiments, the iterations of process 100 eventually converge to an optimal target timing delay for the circuit.

In order to meet the target timing delay determined at 104, the actual timing delays of all paths need to be less than or equal to the target or, equivalently, the slack times of all paths need to be greater than or equal to zero. The slack calculated for a path is budgeted across one or more nets comprising the path at 108, for example, using the zero-slack algorithm. The budgeting of slack may be adjusted during the iterations of process 100, for example, based on changes to the value of the target timing delay and/or based upon feedback from previous iterations on effects on timing and/or the abilities to push wires and/or insert double-cut vias. At 110, incremental changes to the layout are made by a routing engine based upon, for example, the budgeted slack. Incremental changes are made to the layout during each iteration so that the effects of the changes can be evaluated and guide processing in subsequent iterations. In some embodiments, adjustments are first attempted with respect to the most timing violating paths and/or nets, e.g., candidate and/or critical paths and/or nets. The set of candidate and/or critical paths and/or nets may change across one or more iterations of process 100. Adjustments with respect to paths and/or nets that are not candidates and/or critical may also be made at 110. Since timing and yield optimizations are competing objectives, in some embodiments, process 100 is employed to concurrently optimize both so that an optimal or near optimal timing and yield can be achieved for a given circuit design. In some embodiments, it is useful to perform timing-aware yield optimization so that a desired timing is not violated.

Although timing optimization by pushing wires and yield optimization by converting single-cut vias into double-cut vias have been described, the techniques described herein may be employed to optimize timing and/or yield using any other appropriate routing techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for optimizing a circuit design including a plurality of nets, comprising:
    analyzing a circuit design using a processor to determine both a potential to increase spacing between wires in the circuit design and a potential for converting single-cut vias into double-cut vias;
    determining a target timing delay for the circuit design based on the analysis and a desired number or percentage of double-cut vias in the circuit design;
    budgeting a potential amount of reduced or increased capacitance to each of one or more nets based on the determined target timing delay; and
    reconfiguring the circuit design based on the budgeted capacitances.

2. A method as recited in claim 1, wherein one or more of the one or more nets to which reduced capacitances are budgeted are associated with one or more paths that violate the target timing delay of the circuit design.

3. A method as recited in claim 1, wherein a potential amount of reduced capacitance is budgeted to a net based on a potential for pushing one or more neighboring wires away from the net.

4. A method as recited in claim 1, wherein a zero-slack algorithm is employed to budget capacitances.

5. A method as recited in claim 1, wherein a grid-less or shape-based routing technology is employed to reconfigure the circuit design.

6. A method as recited in claim 1, wherein reconfiguring the circuit design comprises pushing away neighboring wires from each of one or more of the one or more nets budgeted reduced capacitances.

7. A method as recited in claim 1, wherein the circuit design is incrementally reconfigured.

8. A method as recited in claim 1, further comprising evaluating effects on timing from reconfiguring the circuit design.

9. A method as recited in claim 1, further comprising analyzing the circuit design to determine one or more nets for which increased capacitances are acceptable while still meeting the target timing.

10. A method as recited in claim 1, wherein budgeting includes budgeting a potential amount of increased capacitance to each net for which increased capacitances are acceptable.

11. A method as recited in claim 1, wherein a potential amount of increased capacitance is budgeted to a net based on a potential for converting one or more single-cut vias associated with the net into double-cut vias.

12. A method as recited in claim 1, wherein reconfiguring includes converting one or more single-cut vias into double-cut vias for one or more of the one or more nets for which increased capacitances are budgeted.

13. A method as recited in claim 1, wherein analyzing the circuit design, determining a target timing delay, budgeting capacitances, and reconfiguring the circuit design are iteratively performed.

14. A method as recited in claim 1, further comprising updating the target timing delay.

15. A system for optimizing a circuit design including a plurality of nets, comprising:
    a processor configured to:
        analyze a circuit design to determine both a potential to increase spacing between wires in the circuit design and a potential for converting single-cut vias into double-cut vias;

determine a target timing delay for the circuit design based on the analysis and a desired number or percentage of double-cut vias in the circuit design;

budget a potential amount of reduced or increased capacitance to each of one or more nets based on the determined target timing delay; and reconfigure the circuit design based on the budgeted capacitances; and a memory coupled to the processor and configured to provide instructions to the processor.

16. A system as recited in claim 15, wherein one or more of the one or more nets to which reduced capacitances are budgeted are associated with one or more paths that violate the target timing delay of the circuit design.

17. A system as recited in claim 15, wherein a grid-less or shape-based routing technology is employed to reconfigure the circuit design.

18. A system as recited in claim 15, wherein to reconfigure the circuit design comprises pushing away neighboring wires from each of one or more of the one or more nets budgeted reduced capacitances.

19. A system as recited in claim 15, wherein the processor is further configured to analyze the circuit design to determine one or more nets for which increased capacitances are acceptable while still meeting the target timing.

20. A system as recited in claim 15, wherein to budget includes budgeting a potential amount of increased capacitance to each net for which increased capacitances are acceptable.

21. A system as recited in claim 15, wherein to reconfigure includes converting one or more single-cut vias into double-cut vias for one or more of the one or more nets for which increased capacitances are budgeted.

22. A system as recited in claim 15, wherein to analyze the circuit design, determine a target timing delay, budget capacitances, and reconfigure the circuit design are iteratively performed.

23. A system as recited in claim 15, wherein the processor is further configured to update the target timing delay.

24. A computer program product for optimizing a circuit design including a plurality of nets, the computer program product being embodied in a computer readable storage medium and comprising computer instructions for:

analyzing a circuit design to determine both a potential to increase spacing between wires in the circuit design and a potential for converting single-cut vias into double-cut vias;

determining a target timing delay for the circuit design based on the analysis and a desired number or percentage of double-cut vias in the circuit design;

budgeting a potential amount of reduced or increased capacitance to each of one or more nets based on the determined target timing delay; and reconfiguring the circuit design based on the budgeted capacitances.

25. A computer program product as recited in claim 24, wherein reconfiguring the circuit design comprises reconfiguring the circuit design using a grid-less or shape-based routing technology.

26. A computer program product as recited in claim 24, wherein reconfiguring the circuit design comprises pushing away neighboring wires from each of one or more of the one or more nets budgeted reduced capacitances.

27. A computer program product as recited in claim 24, wherein a potential amount of increased capacitance is budgeted to a net based on a potential for converting one or more single-cut vias associated with the net into double-cut vias.

28. A computer program product as recited in claim 24, wherein reconfiguring includes converting one or more single-cut vias into double-cut vias for one or more of the one or more nets for which increased capacitances are budgeted.

29. A computer program product as recited in claim 24, wherein analyzing the circuit design, determining a target timing delay, budgeting capacitances, and reconfiguring the circuit design are iteratively performed.

30. A computer program product as recited in claim 24, the computer program product further comprising computer instructions for updating the target timing delay.

\* \* \* \* \*